United States Patent [19]

Totoki et al.

[11] Patent Number: 5,183,562
[45] Date of Patent: Feb. 2, 1993

[54] APPARATUS FOR COAGULATING TREATMENT

[75] Inventors: Toshio Totoki; Hirotake Shigemi; Yoshio Yasukawa, all of Shinjuku, Japan

[73] Assignee: Kurita Water Industries Ltd., Tokyo, Japan

[21] Appl. No.: 743,347

[22] PCT Filed: Feb. 20, 1990

[86] PCT No.: PCT/JP90/00197

§ 371 Date: Aug. 6, 1991

§ 102(e) Date: Aug. 6, 1991

[87] PCT Pub. No.: WO90/09835

PCT Pub. Date: Sep. 7, 1990

[30] Foreign Application Priority Data

Feb. 23, 1989 [JP] Japan .................................. 1-44290
Nov. 10, 1989 [JP] Japan ................................ 1-293358

[51] Int. Cl.$^5$ ..................... B01D 21/30; G01N 25/18
[52] U.S. Cl. .................................. 210/85; 210/96.1; 210/149; 210/199; 210/709; 210/727; 210/742; 210/360.1; 374/44; 374/142
[58] Field of Search ................. 210/85, 96.1, 143, 149, 210/198.1, 199, 709, 739, 742, 726, 727, 219, 348, 360.1; 374/43, 44, 141, 142

[56] References Cited

U.S. PATENT DOCUMENTS 3,170,868 2/1965 Atkinson ........................... 210/709

FOREIGN PATENT DOCUMENTS

| 0144443 | 6/1985 | European Pat. Off. | ............... 374/43 |
| 150111 | 7/1985 | European Pat. Off. | ............... 374/43 |
| 0170071 | 2/1986 | European Pat. Off. | ........... 210/709 |
| 2306704 | 8/1974 | Fed. Rep. of Germany | ...... 210/143 |
| 60-064117 | 4/1985 | Japan | .................. 210/143 |
| 62-269796 | 11/1987 | Japan | .................. 210/143 |
| 1095940 | 6/1984 | U.S.S.R. | ............... 210/143 |
| 1376022 | 2/1988 | U.S.S.R. | .................. 374/44 |

OTHER PUBLICATIONS

Publication "Instrumentation and Automation Systems for Waterworks", Applications of distributed instrumentation and control system TOSDIC TM for waterworks, Kawabe et al., Toshiba Review, No. 133 (May–Jun. 1981) pp. 5–13.
Publication "Stimultaneous Measurement of the Thermal Conductivity and the Thermal Diffusivity of Liquids by the Transient Hot-Wire Method", Nagasaka et al., Rev. Sci. Instrum 52(2), Feb. 1981, 1981 American Institute of Physics, pp. 229–232.

Primary Examiner—Robert A. Dawson
Assistant Examiner—Joseph Drodge
Attorney, Agent, or Firm—Kanesaka and Takeuchi

[57] ABSTRACT

An apparatus for coagulating treatment which is capable of controlling the amount of addition of a coagulant to the optimum level thereby minimizing the water content of the dehydrated cake comprises coagulant adding devices (6), (7), and (8) for causing the coagulant to be added in a variable amount to a liquid subjected to the coagulating treatment, a heat transfer detecting meter (12) disposed so as to contact the liquid to which the coagulant is to be added, the liquid to which the coagulant has been added, or the filtrate from the liquid to which the coagulant has been added and adapted to detect a feeble change in the physical property of the liquid in the form of a change in voltage, and a control device (16) for controlling the amount of addition of the coagulant in the coagulant adding device (8) so that the value of detection of the heat transfer detecting meter (12) is minimized or kept within a desired range.

16 Claims, 11 Drawing Sheets

AMOUNT OF ADDITION OF COAGULANT

AMOUNT OF ADDITION OF COAGULANT

APPARATUS FOR COAGULATING TREATMENT

FIELD OF THE INVENTION

This invention relates to an apparatus for coagulating treatment. Particularly, this invention relates to an apparatus for coagulating treatment aimed at controlling to optimize the amount of a coagulant to be injected (added) to a liquid under treatment. More particularly, this invention relates to an apparatus for coagulating treatment suitable for controlling the amount of an organic coagulant (hereinafter referred to occasionally as "polymer") to be added to a liquid under treatment.

BACKGROUND OF THE INVENTION

Heretofore, various methods have been proposed for the control of a coagulant to be added in the dehydration of sludge. It has been proposed, for example, to control the amount of a coagulant to be added by indirectly measuring the residual polymer content of the liquid with the aid of a viscosimeter in view of the fact that the viscosity of the liquid varies with the residual polymer content and then using the result of this measurement as the criterion for the control.

The physical properties of the liquid include specific heat, electric conductivity, etc. besides the viscosity. They bring about various effects on the operation of addition of the coagulant. When the amount of addition of the coagulant is controlled by using as a sole criterion the viscosity which is only one of the physical properties, therefore, the actual amount of addition deviates from the proper level possibly to the extent of entailing ineffective coagulation, excessive addition of the coagulant, and unduly high cost of the coagulant.

DISCLOSURE OF THE INVENTION

An object of this invention is to solve the problems of the prior art described above and provide an apparatus for the coagulating treatment which allows the amount of addition of a coagulant to be controlled accurately and consequently optimized.

Another object of this invention is to provide a coagulating treatment apparatus which prevents the amount of addition of a coagulant from otherwise possibly deviating and accomplishes the coagulating treatment inexpensively and efficiently.

These objects are accomplished by an apparatus for the coagulating treatment wherein a coagulant is added to a liquid subjected to the coagulating treatment, which apparatus comprises a device for coagulant addition capable of adjusting the amount of addition of the coagulant, a liquid to which the coagulant is to be added, a heat transfer detector disposed so as to contact the liquid containing the added coagulant or the filtrate from the liquid containing the added coagulant, and a control device for controlling the amount of the coagulant supplied by the device for coagulant addition in accordance with the value of detection displayed on the heat transfer detector.

The present invention resides in controlling the amount of addition of a coagulant to a sludge by detecting changes in the physical constants of the sludge due to changes in the properties of the sludge as changes in heat transfer and adopting the detected changes in heat transfer as the criterion for the control.

The inventors made a study for many years concerning the dehydrating property of a liquid resulting from a coagulating treatment, to acquire a knowledge that the water content of the cake resulting from the dehydration, the detected value with the heat transfer detector in the liquid produced by the coagulating treatment (or the liquid undergoing the coagulating treatment) and the concentration of added coagulant in the sludge are closely relates to each other as illustrated in FIGS. 5 and 6, and the water content of the dehydrated cake is minimized by controlling the amount of addition of the coagulant so as to minimize the numerical value detected by the use of a hot-wire current meter, for example, in addition to the conventional knowledge.

FIGS. 5 and 6 are graphs showing the relation among the amount of addition of a coagulant (cationic polymer) to a sewage-mixed raw sludge as a raw water, the value of detection (potential difference) indicated on a hot-wire flow meter, and the water content of dehydrated cake.

As shown in FIG. 5, the value of detection indicated by the hot-wire current meter is in the minimum zone and the water content of the dehydrated cake is minimum when the amount of addition of the coagulant is about from 150 to 200 ppm.

FIG. 6 is a diagram showing a similar relation obtained of a different mixed raw sludge from the sludge of FIG. 5. It is seen that the value of detection indicated by the hot-wire current meter and the water content of the dehydrated cake are both minimum when the amount of addition of a coagulant was approximately in the neighborhood of 150 ppm. When this test was repeated on various kinds of raw waters, the results clearly showed relations similar to those shown in FIGS. 5 and 6. It has been further demonstrated that relations similar to those mentioned above exist concerning properties of cake separation and amount of filtrate besides the water content of the cake.

The present invention has been completed on the basis of these knowledges. Since it effects the control of the amount of addition of a coagulant based on the value of detection obtained with a heat transfer detector, it is capable of adjusting the amount of addition of the coagulant so as to minimize the water content of the dehydrated cake.

BEST MODE OF EMBODYING THE INVENTION

Now, the present invention will be described below with reference to working examples as illustrated in the accompanying drawings.

Figure 1:
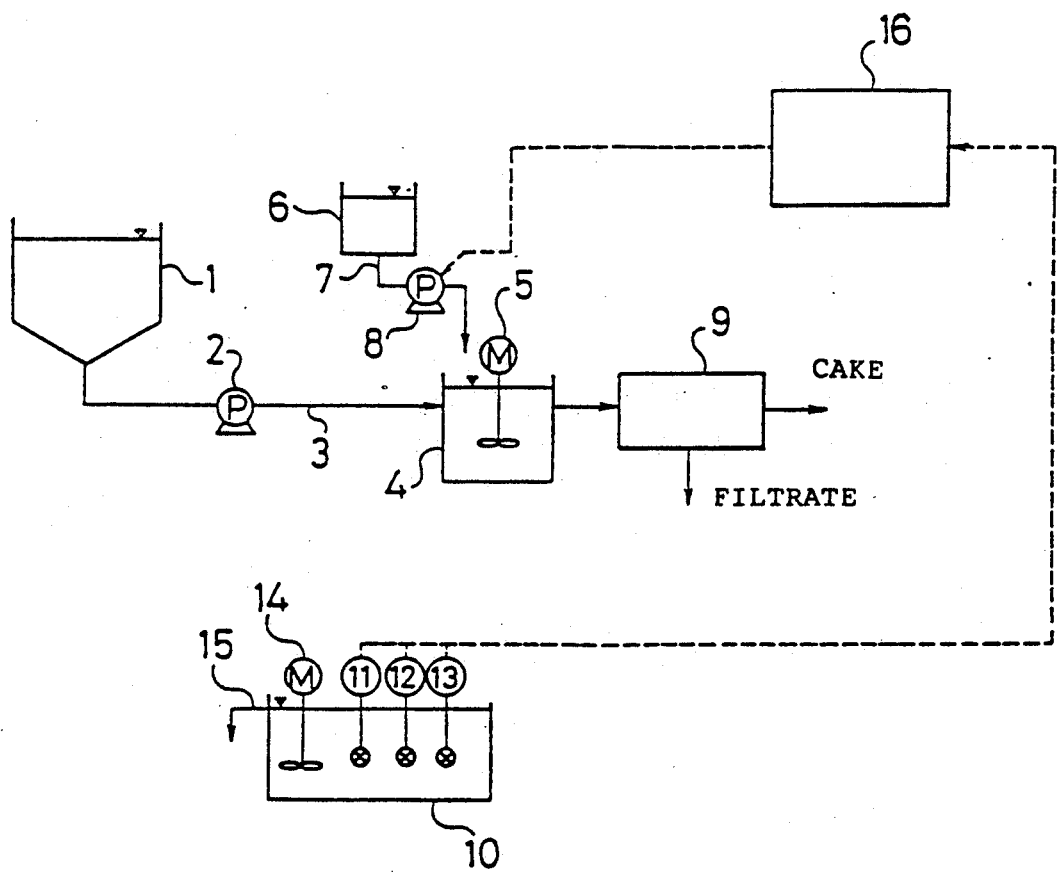
FIG. 1, FIG. 2, and FIG. 3 are system diagrams of an apparatus embodying the present invention.

FIG. 1 is a system diagram of an apparatus for the coagulating treatment in one working example of this invention. The raw water from a raw sludge pit 1 is forwarded through a pipe 3 provided with a pump 2 and introduced into a coagulation tank 4. The coagulation tank 4 is provided with a stirrer 5 and is supplied with a cationic organic coagulant from a coagulant injecting device which comprises a coagulant storage tank 6, a coagulant injection pipe 7, and a coagulant injection pump 8. The liquid resulting from the coagulating treatment in the coagulation tank 4 is transferred to a dehydrator 9 as solid-liquid separating means. The dehydrated cake produced in the dehydrator 9 is forwarded to the step of cake disposal using an incinerator, for example, while the filtrate is forwarded to a filtrate storage tank 10.

The filtrate storage tank 10 is provided with a thermometer 11, a heat transfer detector 12, and an electric conduction meter 13.

The detection signals issued from these measuring instruments 11, 12, and 13 are introduced into an operation controller 16. The operation controller 16 system diagrams a control signal to the coagulant injection pump 8. The pump 8 is subjected to inverter control, for example.

As the heat transfer detector contemplated by this invention, a hot-wire type or hot-film type current meter or a heat conductivity meter which is generally used for the detection of heat transfer can be adopted.

Otherwise, a device which is provided with a self-heating source capable of energizing a heater and effecting required heating or a device which is provided with a heating source such as the combination of a heater with a thermometer and, is allowed to effect indirect heating with the heater, may be adopted.

Now, the present invention will be described below with reference to an embodiment resorting to a hot-wire current meter.

The hot-wire current meter, as universally known, is designed to keep a flow of a fixed electric current to a hot wire serving as a heating member and insert this hot wire in a fluid. A change in the flow rate of this fluid produces a proportionate change in the degree with which the fluid deprives the hot wire of heat. As a result, the temperature of the hot wire is changed and the resistance thereof is also changed. The hot-wire current meter detects this change in resistance in the form of a change in voltage and determines the flow rate of the fluid.

The present invention utilizes the operating principle of this hot-wire current meter, sets conditions for a constant flow rate of the fluid and, thereby, determines a change in the flow rate by detecting the transfer of feeble heat removed from the hot wire in the form of a change in resistance (voltage) and then perceiving this change in resistance in the form of a change in physical property. The filtrate storage tank 10, therefore, is provided with a stirrer 14 and, for the purpose of enabling the stirrer 14 to be rotated constantly at a fixed speed in the course of measurement and, at the same time, uniformizing the conditions of stirring, further provided with an overflow pipe 15 adapted to maintain a fixed level in the tank.

Figure 4:
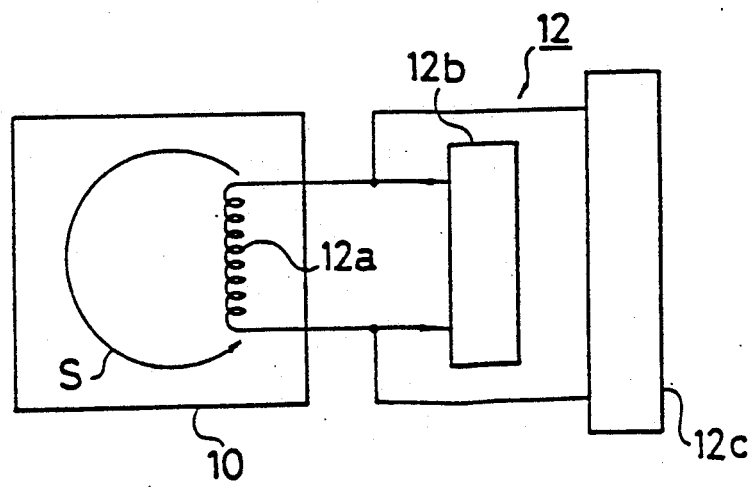
FIG. 4 is a block diagram of a hot-wire current meter.
Figure 5:
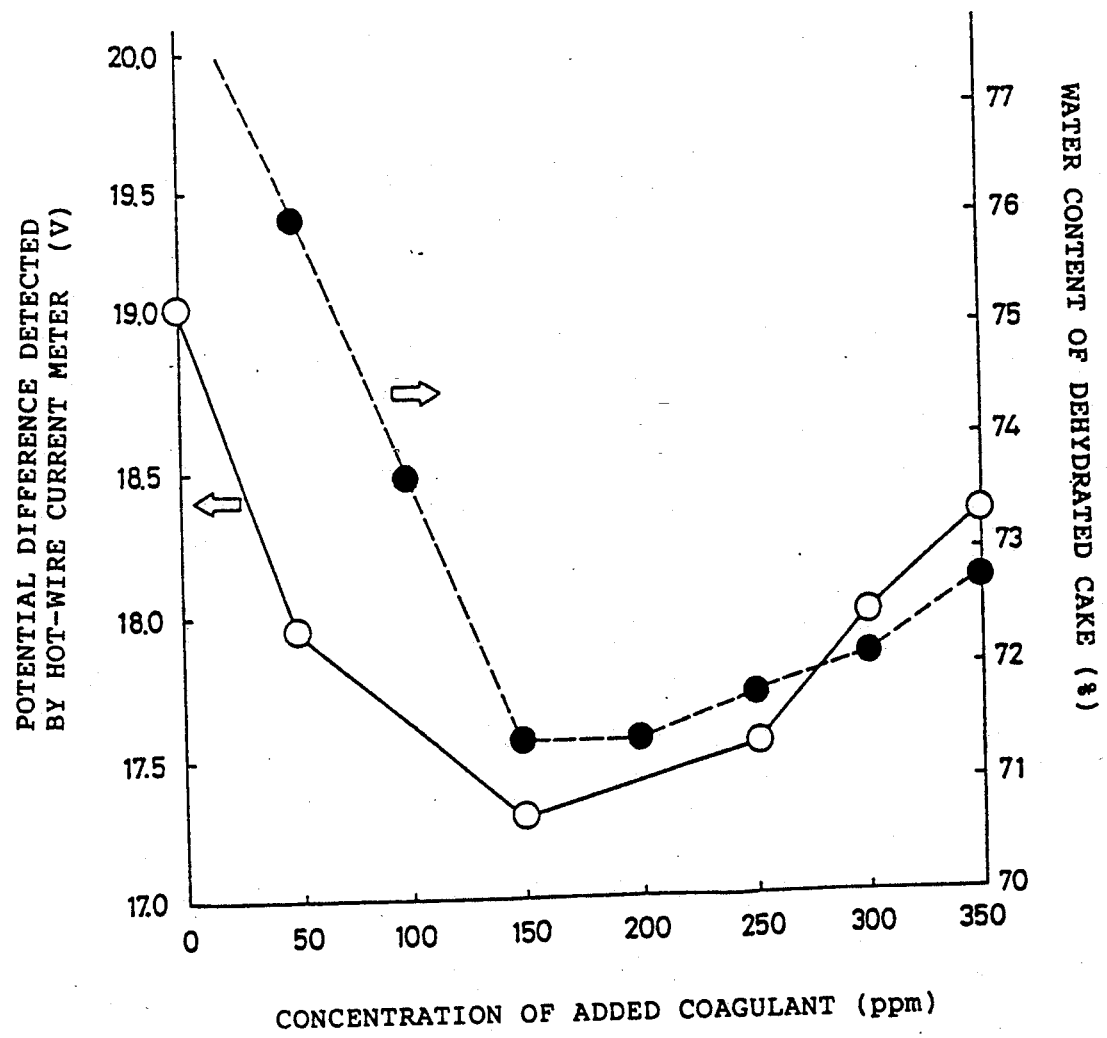
FIG. 5 and FIG. 6 are graphs showing test results.
Figure 6:
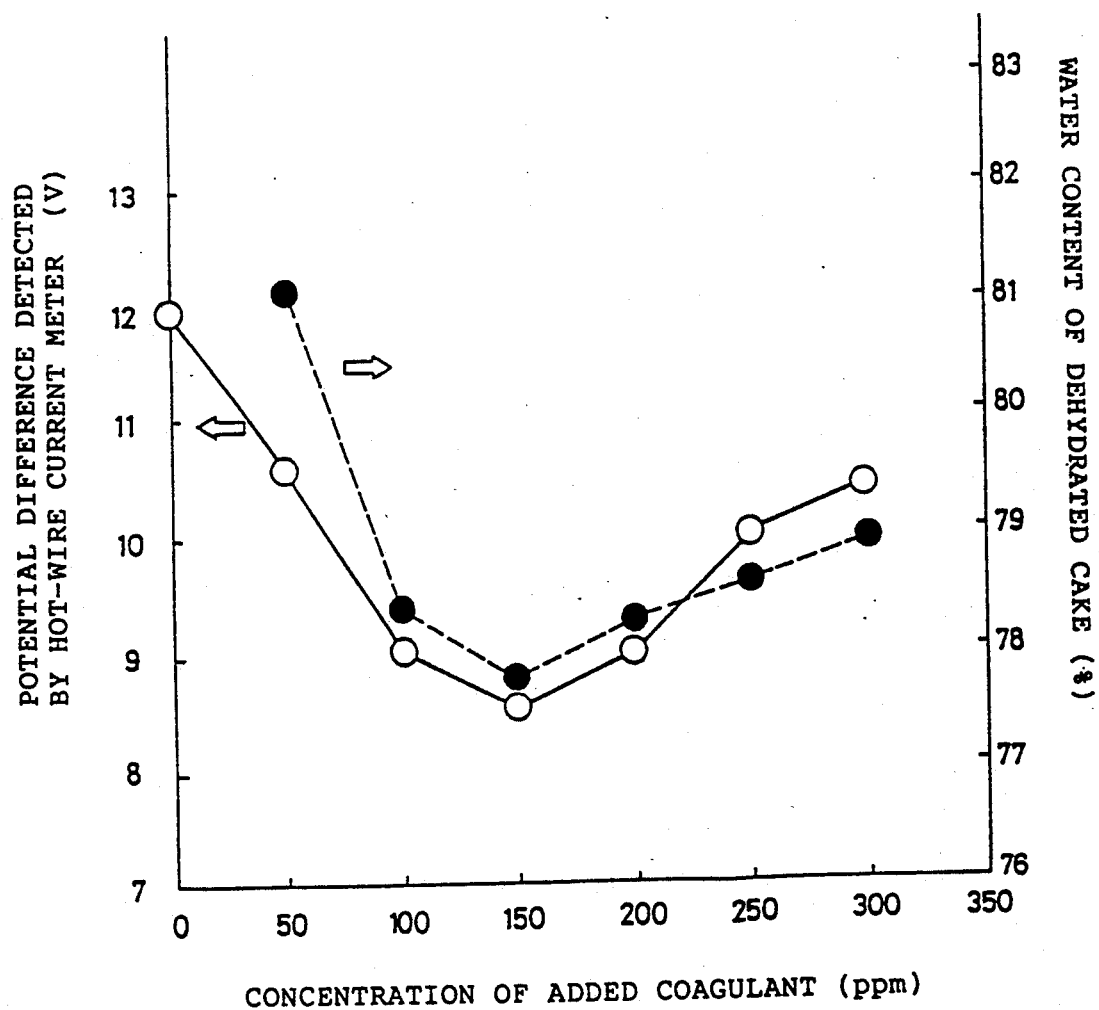

FIG. 4 is a schematic structural diagram of the hot-wire current meter 12 which is used in the present working example. This hot-wire current meter 12 is provided with a hot wire (resistor) 12a, constant-current generator 12b, and a voltmeter 12c.

The hot wire 12a is kept in contact with the liquid being circulated at a fixed flow rate as indicated by an arrow mark S inside the filtrate storage tank 10. While this liquid has fixed physical properties, the hot wire 12a in which a constant current is flowing offers a fixed resistance and consequently a constant voltage because the amount of heat removed from the hot wire 12a is fixed. When a change occurs in the physical properties of the liquid, the resistance is varied because the amount of heat removed from the hot wire 12a is varied. To be specific, the change in resistance occurs because there arises transfer of heat from the hot wire into the liquid. Since the electric current flowing in the hot wire 12a is constant, the change in resistance can be detected as a change in voltage. This change in voltage represents the detected value of the physical property in the liquid. The change in the physical property of the hot wire 12a may be detected in the form of a change in resistance or in voltage.

The working example has been described as using a constant-current hot-wire current meter. Optionally, this invention may be embodied with a constant-temperature type hot-wire current meter.

As clearly noted from the description made thus far, the use of the hot-wire current meter in the way contemplated by this invention permits detection of even a feeble change in physical property by simply giving a fixed flow rate.

In the apparatus of FIG. 1 which is constructed as described above, the raw water in the coagulation tank 4 is subjected to a coagulating treatment caused by addition of a coagulant. The amount of addition of this coagulant in this case is so controlled as to minimize the value of the detection made in the filtrate storage tank 10 and indicated by the hot-wire current meter.

Figure 7A:
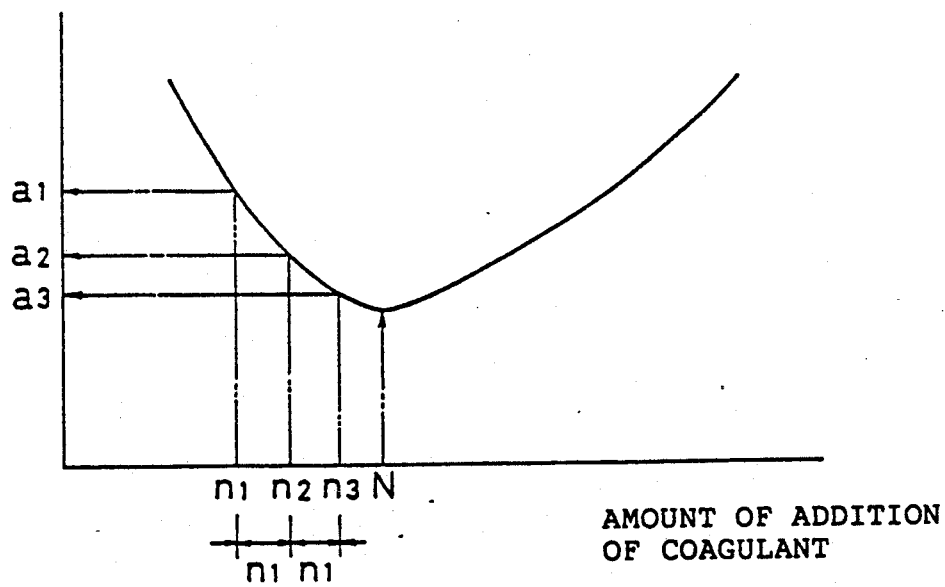
FIG. 7A and FIG. 7B are graphs to aid in the explanation of the method of control.
Figure 7B:
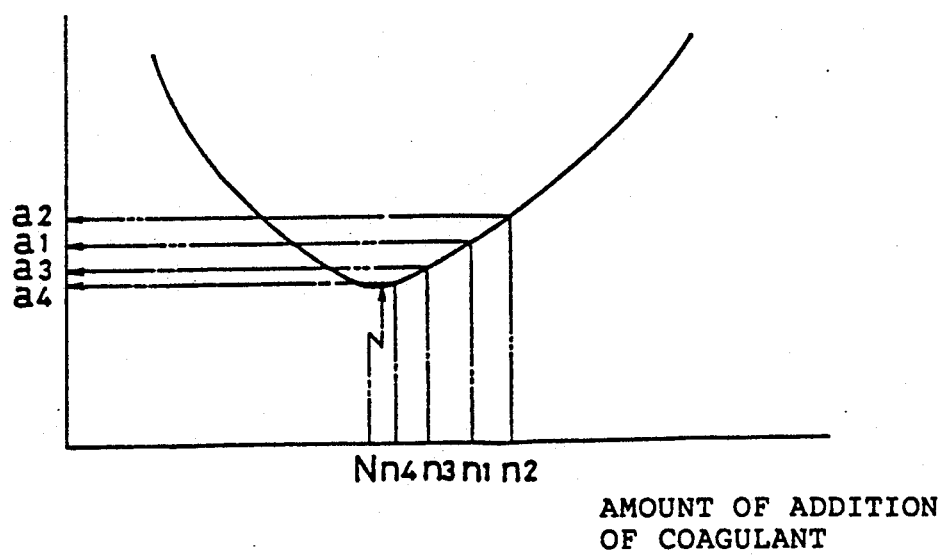

The method for controlling the amount of addition of the coagulant will be described below with reference to FIG. 7A and FIG. 7B. FIG. 7A and FIG. 7B are typical diagrams intended to aid in the explanation. While they show changes, $\Delta n$, in the amount of addition of a coagulant with great exaggeration, the actual changes may be properly selected to suit the kind of polymer, for example.

With reference to FIG. 7A, it is assumed that the amount of addition of a coagulant at a given time $t_1$ is $n_1$ and the amount of addition of the coagulant at the next time $t_2$ is $n_2$ ($n_2$ is a feeble amount, $\Delta n$, larger than $n_1$. When the values of detection, $a_1$ and $a_2$, of the hot-wire current meter obtained respectively for the amounts, $n_1$ and $n_2$, of addition are compared and $a_2$ is found to be smaller than $a_1$, the amount of addition at the subsequent time $t_3$ is changed to $n_3$ ($n_3$ is $\Delta n$ larger than $n_2$). This procedure is repeated. As a result, the amount of addition is gradually approximated to the amount of addition, N, that minimizes the value of detection of the hot-wire current meter.

With reference to FIG. 7B, the value of detection of the hot-wire current meter grows from $a_1$ to $a_2$ as the amount of addition is increased from $n_1$ to $n_2$. In this case, the amount of addition at the subsequent time $t_3$ is decreased from $n_2$ to $n_3$ ($n_3$ is $\Delta n$ smaller than $n_2$). Then, at the further subsequent time $t_4$, the amount of addition is changed to $n_4$ ($n_4$ is $\Delta n$ smaller than $n_3$). By repeating this procedure, required approximation to the amount of addition, N, that minimizes the value of detection of the hot-wire current meter can be attained.

With reference to FIG. 7A and FIG. 7B, the repeated change in the amount of addition by a fixed increment $\Delta n$ may possibly result in an excess amount beyond the optimum amount of addition N. If this excess addition takes place, the amount of addition is decreased by ½Δn at a time, for example. When the repeated decrease in the amount of addition results in an excess amount beyond the optimum amount N, then the amount of addition is reversively returned by ¼Δn. By gradually decreasing the rate of decrement in the manner just mentioned, the amount of addition can be eventually brought to coincidence with the maximum amount of addition N.

Even after the optimum amount of addition N is reached, there still exists the possibility of change of the optimum amount of addition N itself, so that it is desirable to keep the amount of addition varied at a prescribed rate even after it has reached the optimum amount. As a result, it is possible to vary quickly to follow a possible change in the optimum amount.

In the apparatus illustrated in FIG. 1, the values of detection of the thermometer 11 and the electric conductivity meter 13 are also introduced into the operation controller 16. This is because the value of detection of the hot-wire current meter 12 is affected by a possible change in the attributes of the raw water (such as temperature and soluble salt concentration) and, therefore, the portions of contribution made by the changes in temperature and electric conductivity to the change in the value of detection of the hot-wire current meter must be withdrawn (compensated) to allow sole comparison of changes in the value of detection of the hot-wire current meter exclusively with respect to changes in the amount of addition.

Figure 2:
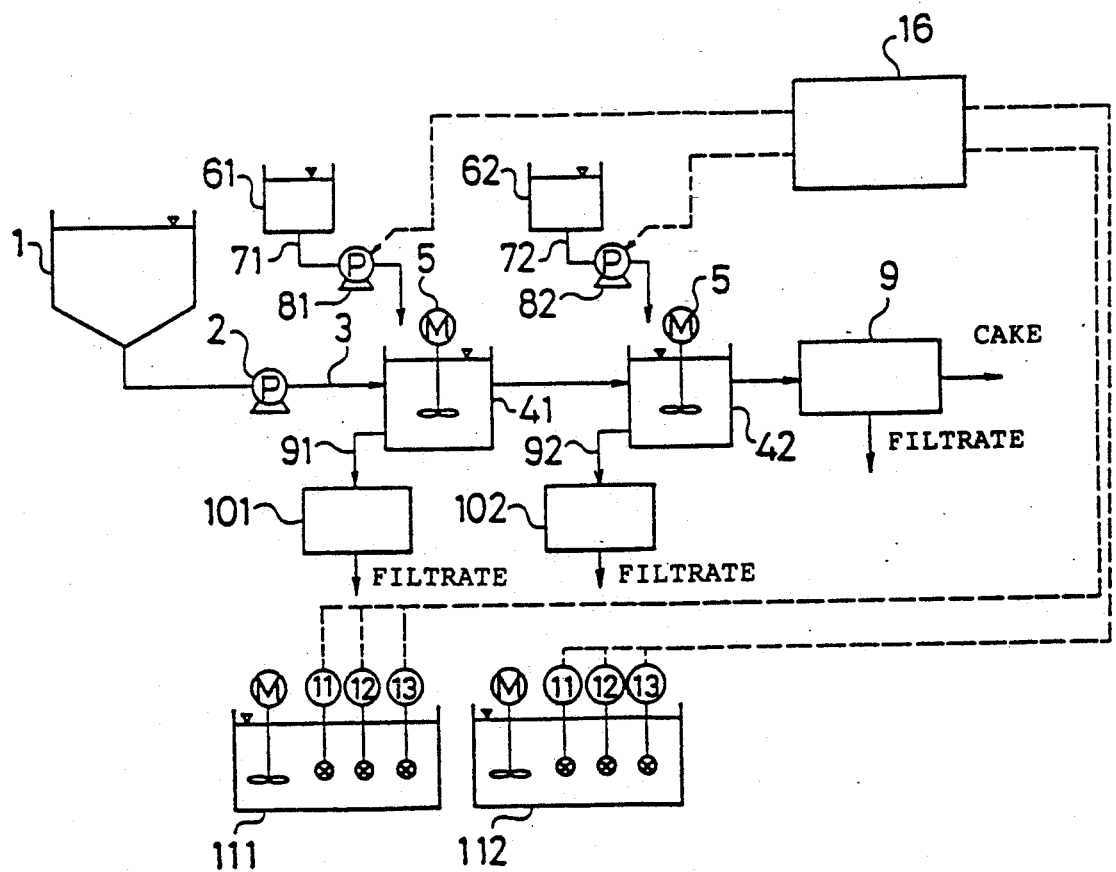

FIG. 2 is a system diagram of an apparatus for coagulating treatment as another embodiment of the present invention.

In this embodiment, a first and a second coagulation tank 41, 42 are installed. To the first coagulation tank 41, a cationic polymer from its storage tank 61 is added via a coagulant injection pipe 71 and a coagulant injection pump 81. To the second coagulation tank 42, an anionic polymer from its storage tank 62 is supplied via a coagulant injection pipe 72 and a coagulant injection pump 82.

To the coagulation tanks 41, 42, filtering devices 101, 102 as solid-liquid separating means are respectively connected via discharge pipes 91, 92 adapted to release liquids from the tanks. The filtrates emanating from these filtering devices are stored respectively in filtrate storage tanks 111, 112. The filtrate storage tanks 111, 112 are provided with the thermometers 11, the hot-wire current meters 12, and the electric conductivity meters 13. The detection signals from these measuring instruments are introduced into the operation controller 16. The coagulant injection pump 81 is controlled in accordance with the data of detection from the filtrate storage tank 111 and the coagulant injection pump 82 is controlled in accordance with the data of detection from the filtrate storage tank 112. This method of control is identical with that which has been described with reference to the apparatus of FIG. 1.

Also in the apparatus of FIG. 2, the coagulant injection pumps 81, 82 may be controlled based on the values of detection of the hot-wire current meter, the temperature, and the electric conductivity obtained through the filtrate from the dehydrator 9.

In the apparatus of FIG. 2, the detection with the hot-wire current meter is effected on both the liquids in the two coagulation tanks 41, 42. Optionally, the detection with the hot-wire current meter may be effected on the liquid in the first coagulation tank 41 and the control mentioned above may be effected only with respect to the amount of addition of the cationic polymer. In this case, the amount of addition of the anionic polymer may be proportionated to the controlled amount of addition of the cationic polymer. Since the sludge is negatively charged, the control is made nearly perfectly by using as the main target of control the amount of addition of the cation polymer which is added first.

Figure 3:
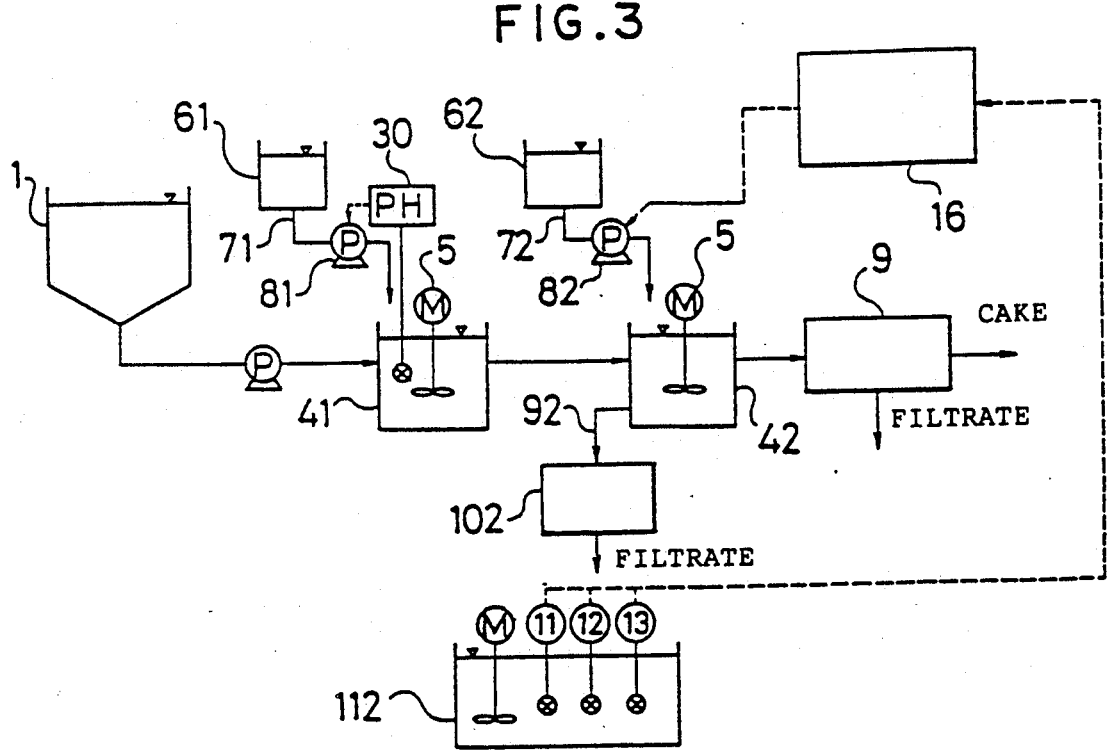

FIG. 3 is a system diagram of an apparatus for coagulating treatment as still another embodiment of this invention.

In this embodiment, an inorganic coagulant is added to the first coagulation tank 41 and an amphoteric polymer is added to the second coagulation tank 42. The detection with the hot-wire current meter is effected on the filtrate from the second coagulation tank 42 and the amounts of addition of the polymers are controlled in accordance with the aforementioned procedure using the results of the detection. In this case, the outcome of the detection with the electric conductivity meter disposed in the filtrate storage tank 112 is used for the purpose of compensating for the effect of the addition of the inorganic coagulant.

Again in the present embodiment, the detection with the hot-wire current meter may be effected on the filtrate from the dehydrator 9 and the control of the amount of addition may be effected on the basis of the outcome of the detection in the same manner as in the embodiment of FIG. 1.

In the present embodiment, the detection with the hot-wire current meter is not effected on the liquid held in the first coagulation tank 41. This is because no clear discrimination may be made as to the question whether changes in the value of detection with the hot-wire current meter with respect to the liquid held inside the second coagulation tank 42 are ascribable to the influence of the inorganic coagulant or to that of the polymer if the filtrate from the first coagulation tank 41 is additionally subjected to detection and control.

In the embodiment of FIG. 3, the first coagulation tank 41 is provided with a pH meter 30 and the amount of addition of the inorganic coagulant is controlled based on the pH data produced by the pH meter so as to be approximated to the optimum amount of addition. In consequence of this control, the otherwise possible excessive addition of the inorganic coagulant is precluded, the effect of the inorganic coagulant on the value of detection of the hot-wire current meter is alleviated to a great extent, and the accuracy of the control of the amounts of addition of the polymers is enhanced.

Particularly when the amphoteric polymer is used as in the present embodiment, the control by means of the pH meter 30 proves to be desirable in the sense of curbing the elution of cation or anion.

In the apparatuses of FIGS. 1 to 3, the coagulated sludge may be even pelletized within the tank by controlling the amount of addition and the revolution number of the stirrer in the coagulation tank.

In the present invention, the hot-wire current meter alone may be used and the thermometer and other measuring instruments may be omitted. Further, the embodiment of FIG. 1, similarly to the apparatuses of FIGS. 2 and 3, may be operated so as to effect the detection with the hot-wire current meter on the liquid held in the coagulation tank.

Though the present embodiment is depicted as adding the coagulant to the coagulation tank, the present invention may be alternatively embodied in an apparatus of coagulating treatment of the type allowing the coagulant to be injected into a pipe for the liquid subjected to the coagulating treatment (the feed pipe for the raw water, for example).

Figure 8:
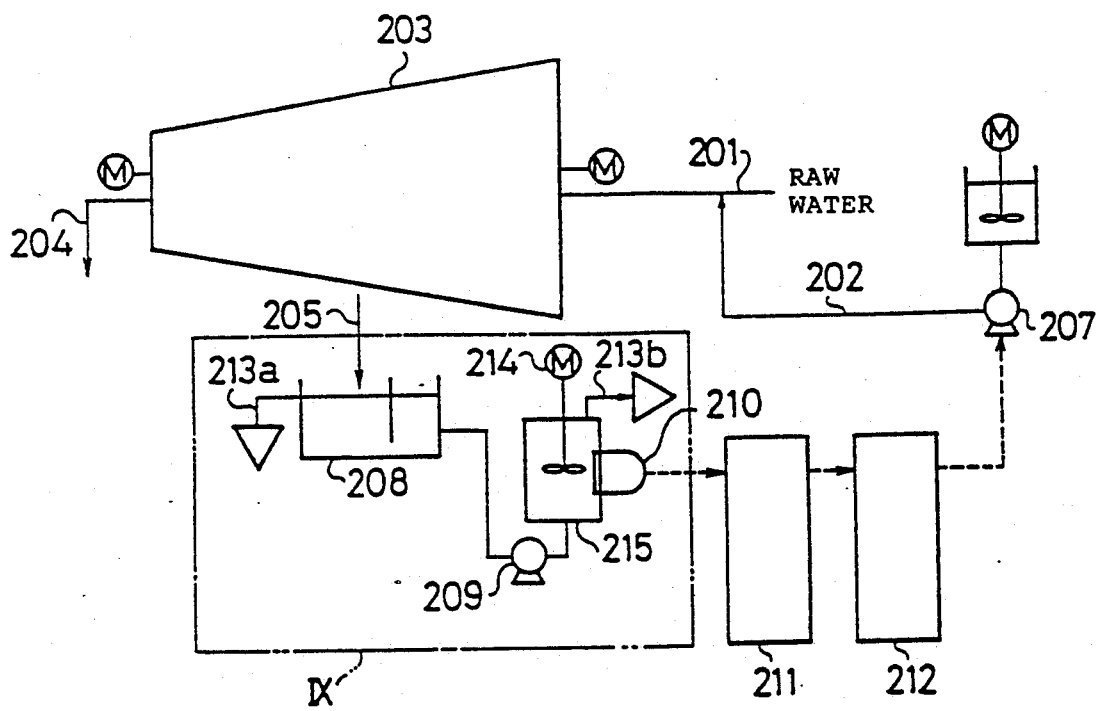
FIG. 8 is a system diagram of another apparatus embodying the present invention.

FIG. 8 is a system diagram of an apparatus for the coagulating treatment conforming to this type of embodiment. The raw water from a raw water storage tank is forwarded via a pipe 201 provided with a raw water pump (not shown) to a centrifugal dehydrator (which may be a belt press dehydrator or a screw press dehydrator; the type of dehydrator irrelevant) 203.

To an inlet halfway along the length of the raw water pump-incorporating pipe 201, a cationic organic coagulant from a coagulant injection device provided with a coagulant injection pipe 202 and a coagulant injection pump 207 is supplied. The solid residue emanating from the dehydrator 203 is discharged through a concentrated sludge outlet 204, to be disposed of separately. The relatively clean liquid separated by the dehydrator is forwarded via a separated clean liquid outlet 205 to a separated liquid storage tank 208. A part of the separated liquid collected in the separated liquid storage tank 208 is quantitatively forwarded by a pump 209 to a sampling tank 215. This sampling tank 215 is provided with a heat transfer meter (hot-wire current meter) 210.

Figure 9:
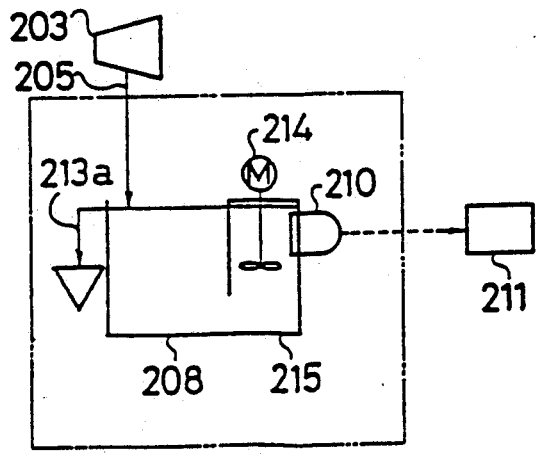
FIG. 9 is a partial structural diagram.

The heat transfer meter of this kind is susceptible conspicuously of the influence of the flow speed of the liquid or susceptible of the influence of the pulsation of the transfer pump 209. To eliminate these influences, the present embodiment is adapted to give to the heat transfer meter a relatively large fixed flow by the use of a stirring device 214 so as to render a possible change in flow volume negligible. When the separated water is caused to flow into the sampling tank by virtue of the difference of height of water level, the pump 209 is omitted as illustrated in FIG. 9 which is a system diagram illustrating another structure for the IX part shown in FIG. 8. Conversely, when the pump 209 is of the type capable of discharging a given fluid continuously at a constant flow rate, the stirring device 214 may be omitted.

In the sampling tank 215, the condition, i.e. physical property, of the separated water is determined with the heat transfer meter 210. The signal of detection from the heat transfer meter 210 is forwarded to a signal amplifier-converter 211 to be converted into the form fit for the operation in the operation controller therein. An operation controller 212, in response to the signal from the converter 211, issues a stated operation signal to the drive device for the coagulant injection pump 207 and consequently effects the control of the amount of addition of the coagulant from the coagulant injection pump 207 through the coagulant injection pipe 202. Preferably, the drive device for the coagulant injection pump 207 is of the type capable of continuously varying the amount of discharge of the pump, i.e. amount of addition of the coagulant, as an inverter.

In FIGS. 8 and 9, each of the reference numerals 213a, 213b denotes an outlet pipe for the treated liquid.

Figure 10:
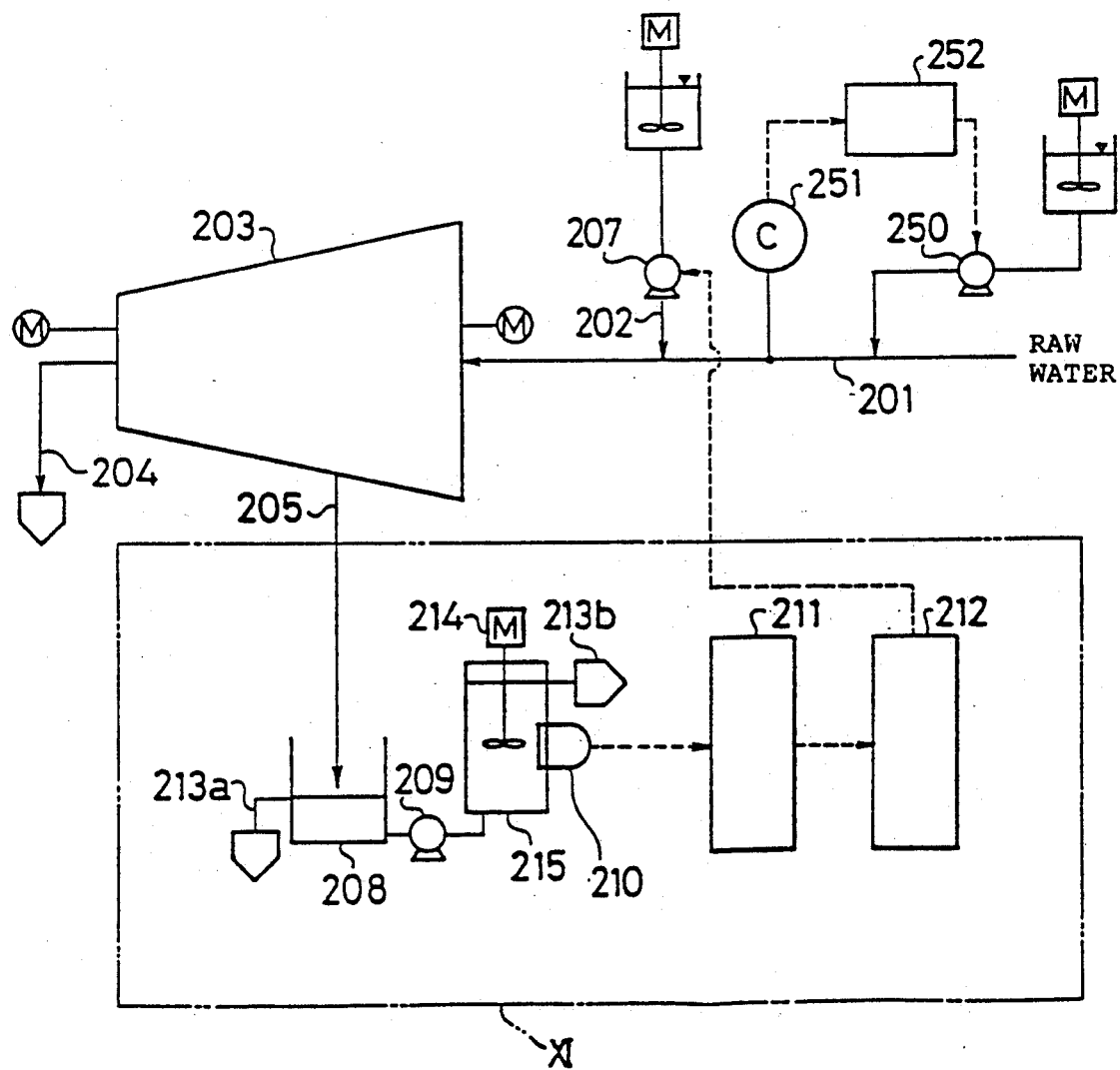
FIG. 10 is a system diagram of yet another apparatus embodying the present invention.

FIG. 10 is a system diagram of an apparatus embodying the present invention by the combined use of an organic coagulant (amphoteric polymer) and an inorganic coagulant. In the present embodiment, the inorganic coagulant is injected into the raw water pipe 201 by a coagulant injection pump 250, and the organic coagulant is subsequently injected into the pipe 201. Between the points of addition of the inorganic coagulant and the organic coagulant, a sensor 251 such as, for example, a pH meter or an electric conductivity meter is provided. On the basis of the signal of detection from this sensor 251, a controller 252 effects the control of the injection of the inorganic coagulant. The remainder of the construction of this embodiment is identical to the construction of the embodiment of FIG. 8. Thus, like component parts are denoted by like reference numerals. Also in this embodiment, the injection pump 207 for the organic coagulant is controlled based on the detection signal from the heat transfer meter 210.

Figure 11:
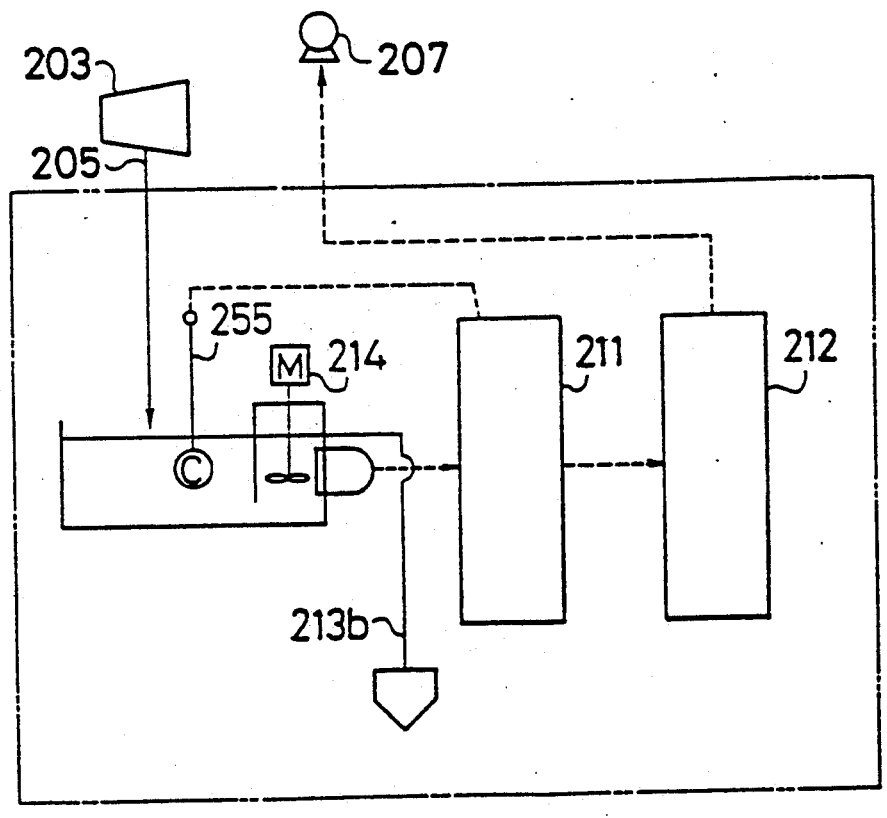
FIG. 11 is a partial structural diagram of the XI part of FIG. 10.

The apparatus of FIG. 10 may be provided, as illustrated in FIG. 11 illustrating another construction for the XI part shown in FIG. 10, with a sensor 255 for measuring the pH value or electric conductivity of the separated water. The control of the addition of the coagulant, accordingly, may be effected on the basis of the detection signal from this sensor 255. Optionally, this embodiment may be further provided with a thermometer. It is also permissible to have the separated water storage tank and the sampling tank integrally formed as illustrated in FIG. 11.

Though the embodiments cited thus far invariably cause the filtrate to flow continuously into the filtrate storage tank, the present invention may otherwise cause the filtrate to be received portionwise in a stated amount into the filtrate storage tank and the detection with the hot-wire current meter may be effected on the separate portions of the filtrate. The batchwise determination involved in this case can be attained by having a level gauge provided for the filtrate storage tank and operating this level gauge in allowing a new batch of the filtrate to flow continuously into the tank completely evacuated of the previous batch of the filtrate until it reaches the stated level and subsequently setting the hot-wire current meter to service.

The present invention may omit the thermometer and rely solely on the hot-wire current meter. It is also allowed to effect the control of the amount of addition by using the cake separation or the amount of filtrate as the criterion of control instead of the water content of the dehydrated cake. It may use two or more of these characteristic properties as criteria for the control of the amount of addition of a coagulant.

Figure 12:
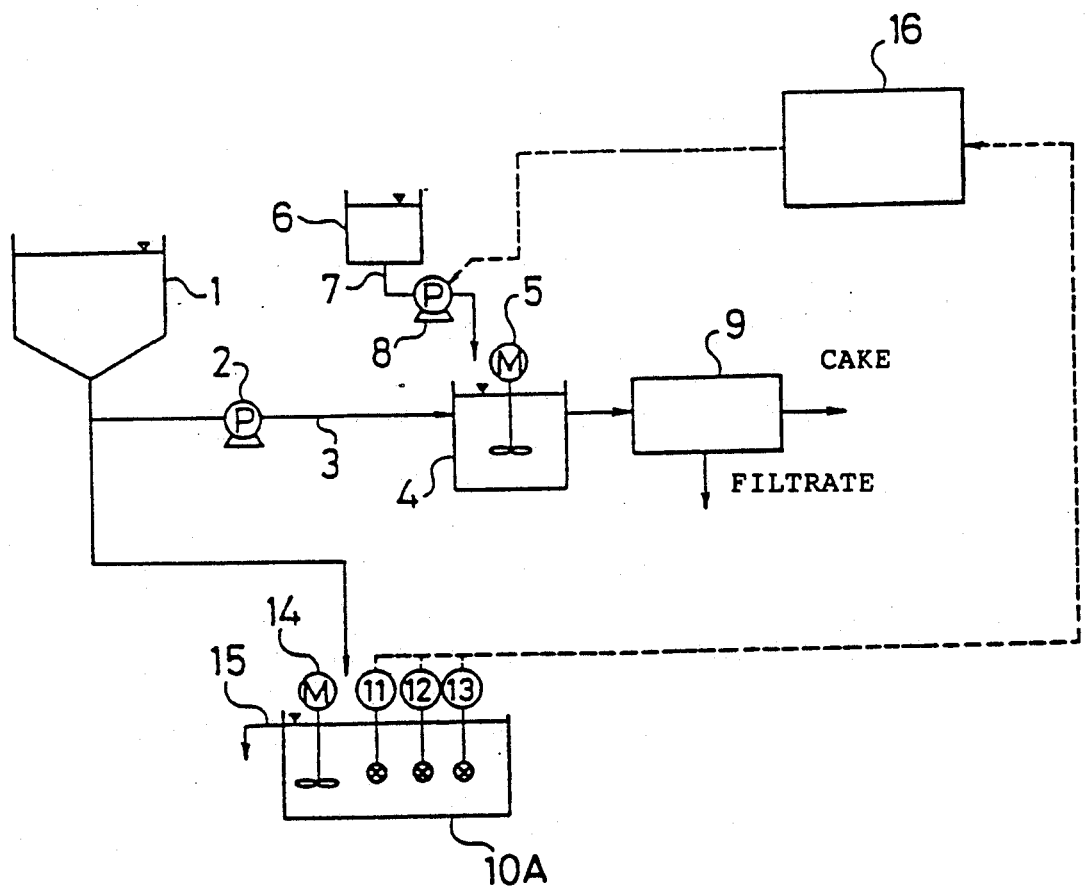
FIG. 12 and FIG. 13 are system diagrams of still another apparatus embodying the present invention.
Figure 13:
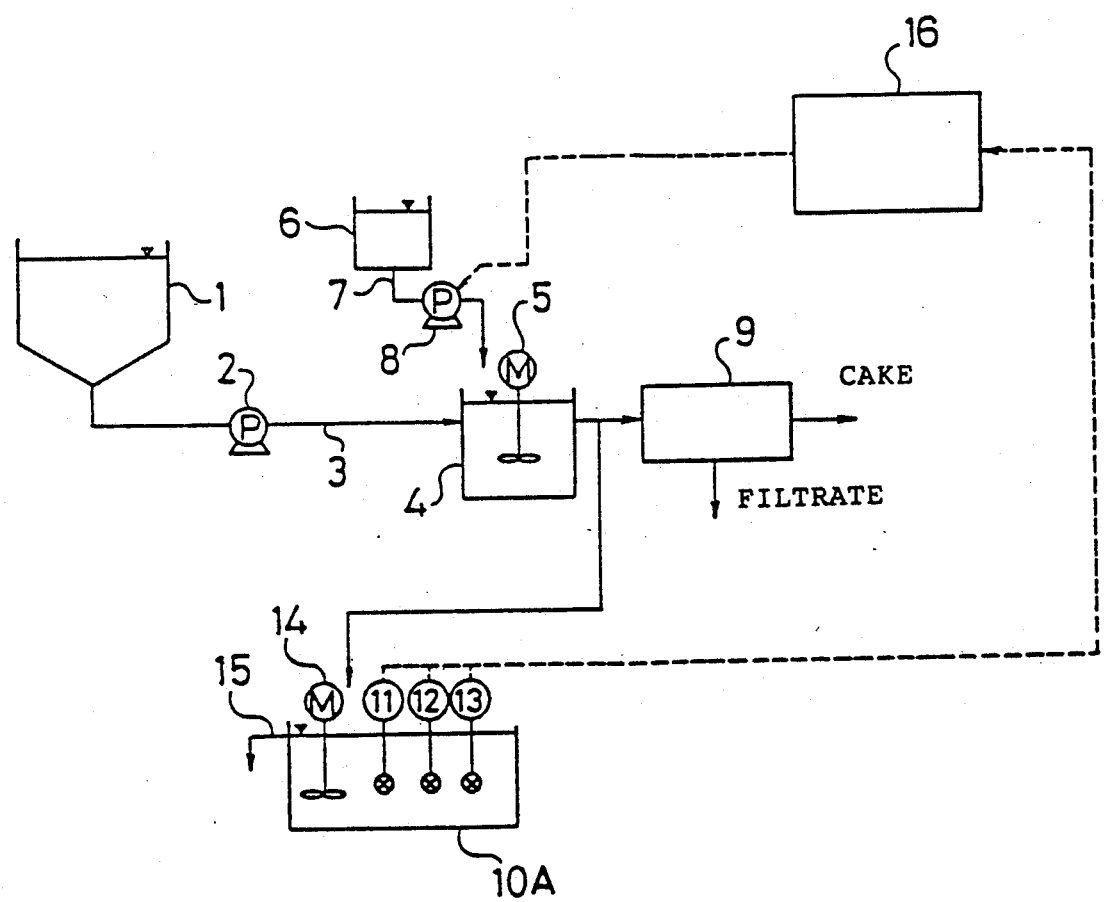

In the embodiments cited above, the filtrate resulting from the dehydration of the coagulant-added liquid is held in contact with the hot-wire current meter. This arrangement is effective in preventing the SS component and the floc from adhering to the hot-wire current meter, stabilizing the operation of the apparatus, and facilitating the maintenance of the apparatus. Optionally, the present invention allows a modification such that the hot-wire current meter directly contacts the liquid before the addition of a coagulant or the liquid before the coagulating treatment as illustrated in FIG. 12 and FIG. 13. Each of the apparatus of FIG. 12 and FIG. 13 is provided with a storage tank 10A for admitting the liquid before the addition of a coagulant (FIG. 12) or the liquid before the coagulating treatment (FIG. 13) in place of the filtrate storage tank 10. The remainders of the construction of the apparatuses of FIG. 12 and FIG. 13 are identical with the construction of the apparatus of FIG. 1. Thus, like component parts are denoted by like reference numerals.

The expression "filtrate from the coagulant-added liquid" as used in the present invention means the filtrate resulting from the filtration of the liquid in the coagulation tank and the dehydrated filtrate resulting from the dehydration of the filtrate just mentioned with the dehydrator.

In the data of control illustrated in FIG. 7, the control is carried out so as to minimize the amount of addition of a coagulant. Optionally, the control may be performed so that the amount of addition of a coagulant will fall in a target range.

Economic Utility of the Invention

As described above, the apparatus of this invention for the coagulating treatment, owing to the use of a heat transfer meter, is capable of easily detecting a feeble change in the physical property of a given liquid in the form of a change in resistance (voltage) and consequently effecting accurate control of the amount of addition of a coagulant and ensuring desired optimization of the amount of addition of the coagulant. Thus, the otherwise possible deviation of the amount of addition of the coagulant is avoided and the required coagulating treatment is effectively and inexpensively carried out.

We claim:

1. An apparatus for effecting coagulation by addition of a coagulant to a liquid, comprising
a coagulant adding device capable of adjusting an amount of addition of the coagulant, means for receiving the coagulant from the coagulant adding device and for effecting coagulation with the liquid, means for separating a coagulated material into a solid content and a liquid content, heat transfer detecting meter so disposed as to contact with one of the liquid to which the coagulant is to be added, the coagulated material before separation and the liquid content separated by said separating means, and a control device communicating with the heat transfer detecting meter and the coagulant adding device for controlling an amount of addition of the coagulant in the coagulant adding device, said amount of the coagulant to be added in said coagulant adding device being controlled by said control device based on an outcome detected by said heat transfer detecting meter.

2. A coagulating apparatus for effecting coagulation in a liquid by addition of a coagulant, comprising first guiding means for receiving a liquid to be subjected to a coagulating treatment and guiding the received liquid to at least one part at which the coagulant is added, adding means for adding the coagulant to the liquid in a variable amount at the part for addition of the coagulant, solid-liquid separating means for separating the liquid with the coagulant into a liquid content and a solid content, second guiding means situated between the adding means and the separating means to guide the liquid to the separating means, a heat transfer detecting meter disposed so as to contact the liquid content separated by the solid-liquid separating means, and control means for controlling an amount of addition of the coagulant through the adding means so that a value of detection of the heat transfer detecting meter is minimized to be within a target range.

3. An apparatus set forth in claim 2, wherein the adding means is a coagulation tank provided with stirring means.

4. An apparatus set forth in claim 3, wherein said solid-liquid separating means separates a part of a liquid in the coagulation tank into the liquid content and the solid content, the separated liquid content is caused to contact the heat transfer detecting meter, and a remaining part of the liquid in the coagulation tank is delivered separately to the downstream side of the guiding means.

5. An apparatus set forth in claim 2, wherein the solid-liquid separating means is a dehydrator.

6. An apparatus set forth in claim 2, wherein the solid-liquid separating means is a filtrating device.

7. An apparatus set forth in claim 2, wherein said adding means includes a plurality of parts for addition of the coagulant.

8. An apparatus set forth in claim 7, wherein said plurality of parts comprises a first part used for addition of a cationic coagulant and a second part used for addition of an anionic polymer coagulant.

9. An apparatus set forth in claim 7, wherein said plurality of parts comprises a first part used for addition of an inorganic coagulant and a second part used for addition of a polymer coagulant.

10. An apparatus set forth in claim 9, wherein said control means controls an amount of addition of the polymer coagulant alone.

11. An apparatus set forth in claim 10, wherein said control means controls an amount of addition of the inorganic coagulant on the basis of one of a pH value or an electric conductivity of a liquid to which the inorganic coagulant has been added.

12. An apparatus set forth in claim 2, wherein said first guiding means is a pipe for passing the liquid for treatment and said adding means is a feed pipe connected to the pipe and adapted to supply the coagulant to the pipe.

13. An apparatus set forth in claim 12, wherein the solid-liquid separating means is a centrifugal dehydrator.

14. An apparatus set forth in claim 2, wherein said heat transfer detecting meter is also coupled to one of a thermometer or an electric conductivity meter, disposed so as to contact the liquid content separated by the solid-liquid separating means so that the control means is enabled to effect required compensation on the basis of the value of detection of the detecting means.

15. An apparatus set forth in claim 2, wherein the heat transfer meter is one of a hot-wire current meter and a hot-film type current meter.

16. An apparatus set forth in claim 2, wherein the adding means includes a tank for a liquid of the coagulant, and a pump and a pipe for forwarding the liquid in the tank to the part.

* * * * *